United States Patent [19]

Crandell

[11] 4,304,544
[45] Dec. 8, 1981

[54] ELECTRICALLY HEATED NOZZLES AND NOZZLE SYSTEMS

[75] Inventor: Walter R. Crandell, Addison, Ill.

[73] Assignee: Fast Heat Element Mfg. Co., Inc., Elmhurst, Ill.

[21] Appl. No.: 951,609

[22] Filed: Oct. 16, 1978

Related U.S. Application Data

[63] Continuation-in-part of Ser. No. 705,996, Jul. 16, 1976, which is a continuation-in-part of Ser. No. 516,618, Oct. 21, 1974, Pat. No. 3,970,821.

[51] Int. Cl.³ ............................................. B29F 1/03
[52] U.S. Cl. .................................... 425/549; 425/568
[58] Field of Search ...................... 425/548, 549, 568

[56] References Cited

U.S. PATENT DOCUMENTS

| | | | |
|---|---|---|---|
| 3,499,189 | 3/1970 | Perras | 425/548 |
| 3,822,856 | 7/1974 | Gellert | 425/549 |
| 3,941,540 | 3/1976 | Driscoll | 425/548 |
| 3,945,535 | 3/1976 | Leiste | 425/549 |

FOREIGN PATENT DOCUMENTS

| | | | |
|---|---|---|---|
| 2207001 | 8/1972 | Fed. Rep. of Germany | 425/547 |
| 2403510 | 8/1975 | Fed. Rep. of Germany | 425/549 |
| 2539785 | 3/1977 | Fed. Rep. of Germany | 425/549 |

*Primary Examiner*—Thomas P. Pavelko
*Attorney, Agent, or Firm*—Martin Faier

[57] ABSTRACT

A unitary integral electrically heated nozzle device for plastic molding or die casting equipment which has a novel casing integral with a heater core, which is insulated to prevent conduction of electricity and loss of thermal transmission to the casing, the electrical insulation being compacted within the casing and around the heater core and the assembly being sealed and swaged into a unitary form, said device being structured to heat the area of a gate or passage for delivery of molten material into a forming cavity. The nozzle device may be shaped, and the nozzle systems include such nozzle devices in the gate channels for delivering molten material to the forming cavity.

The invention also includes a heated nozzle of the character referred to wherein at least a part of said electrical insulation comprises a layer of mica or ceramic insulator material having electrical resistance wire wound thereabout, and a method for making such a nozzle which includes the steps of winding electrical resistance wire about a strip of green insulator material, fitting the wire wound strip in a casing and insulating the wire from the casing, compressing the assembly and heating the compressed assembly.

The invention also includes a lead arrangement where the unitary nozzle is opened midway its ends to expose the wires and lead are connected sealed and insulated through the casing; and also included is a method for making such a lead arrangement.

14 Claims, 39 Drawing Figures

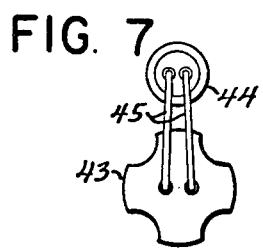
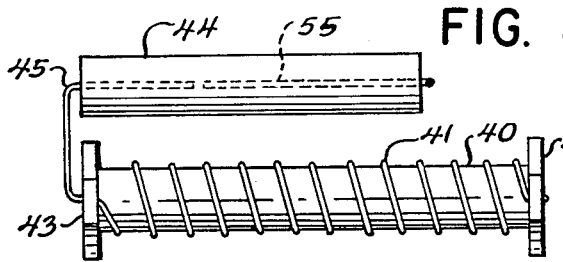
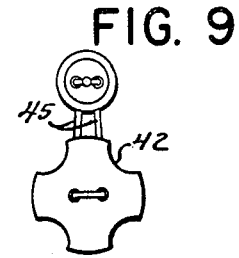
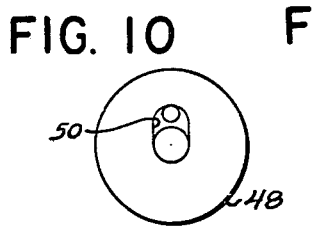
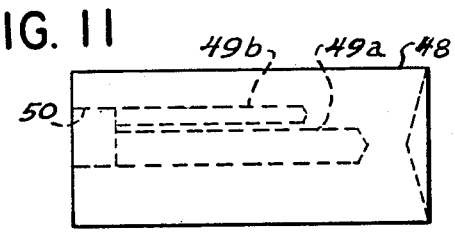
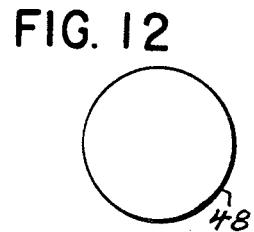
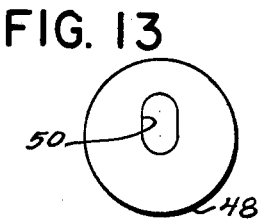
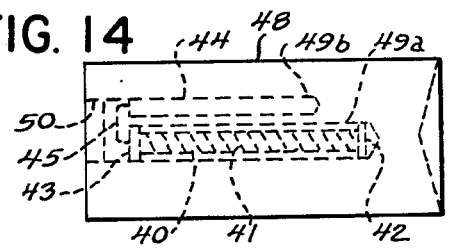
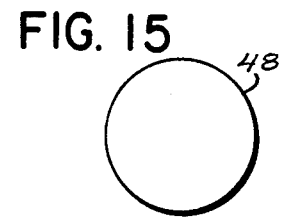
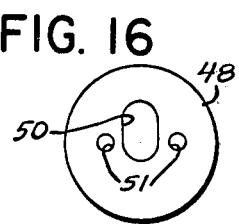
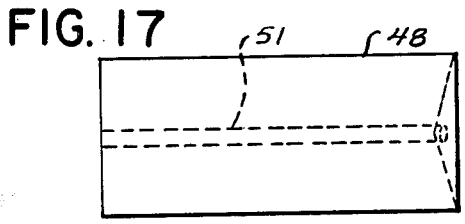
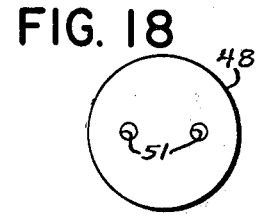
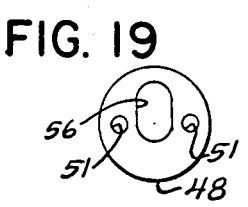
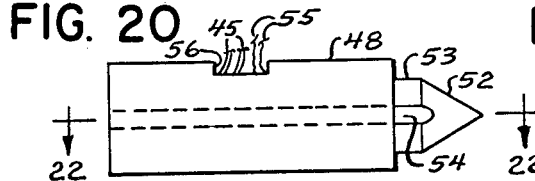
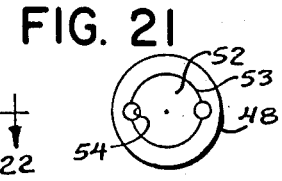
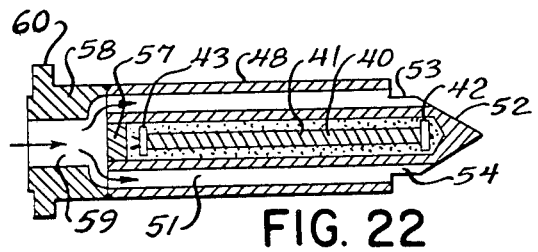

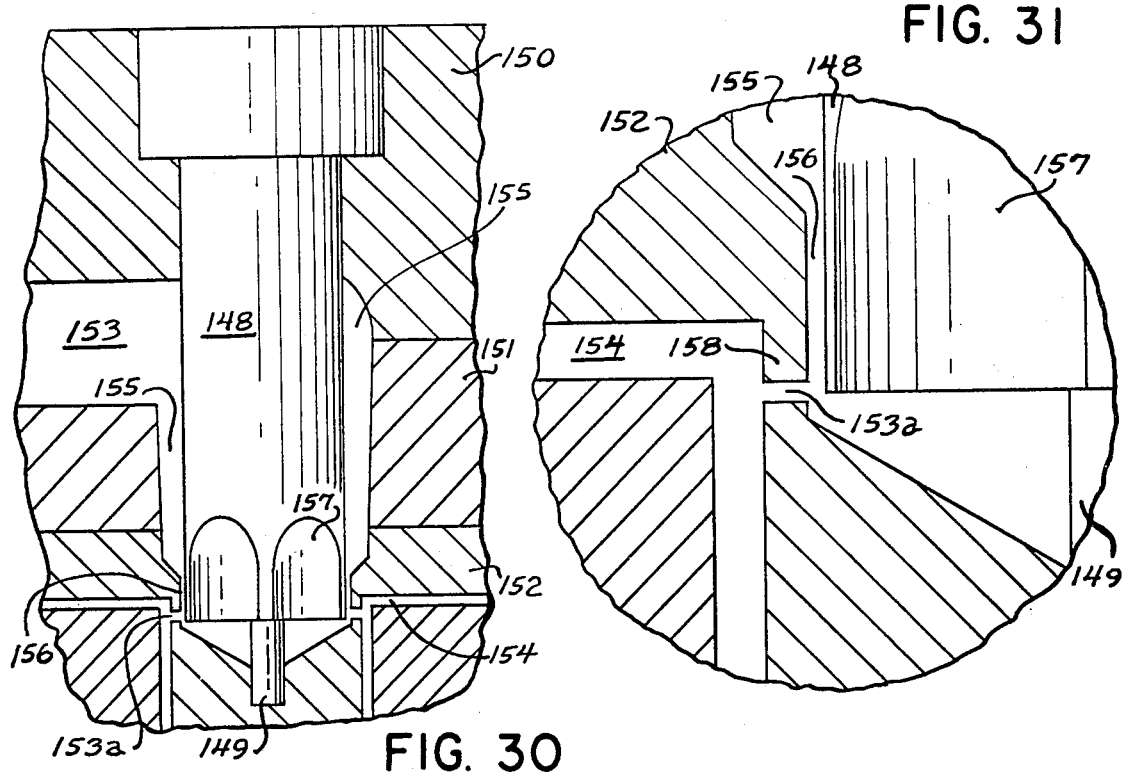
FIG. 30
FIG. 31
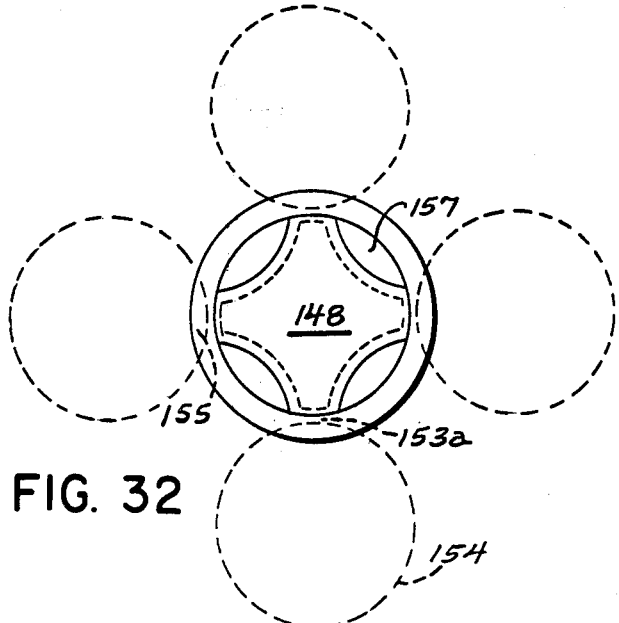
FIG. 32
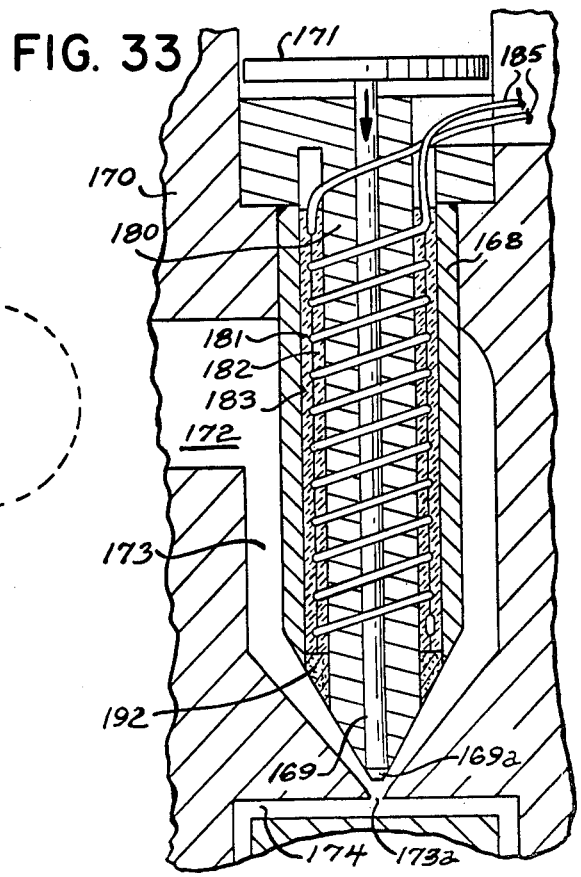
FIG. 33

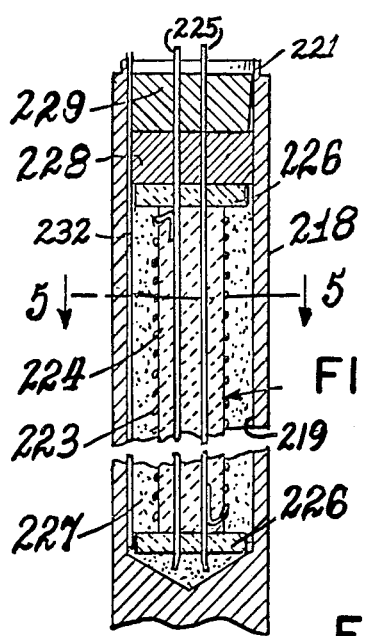
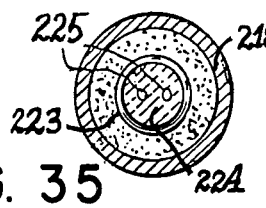
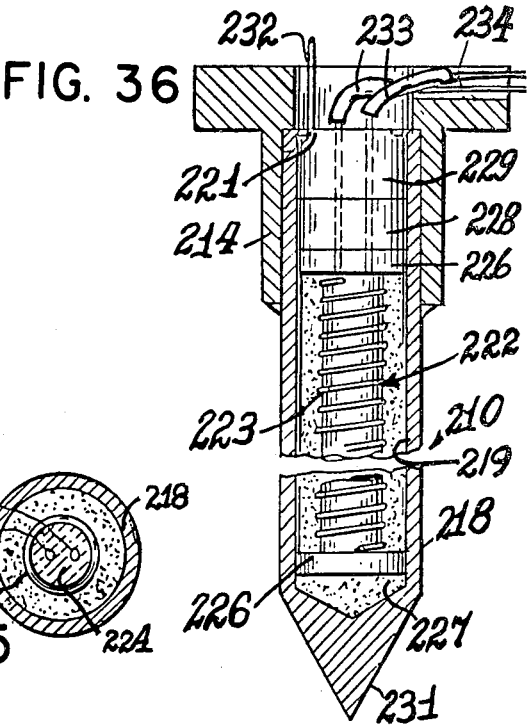
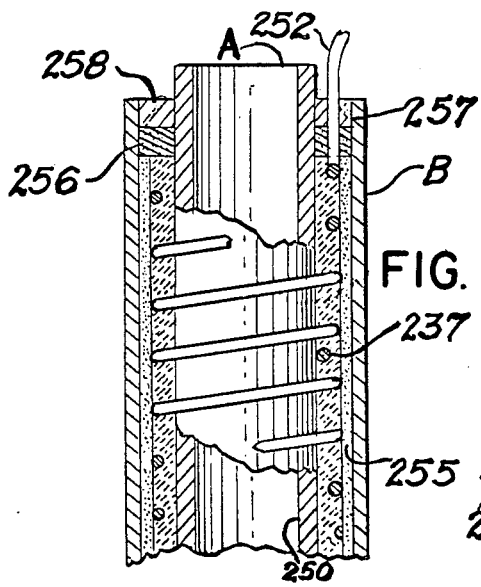
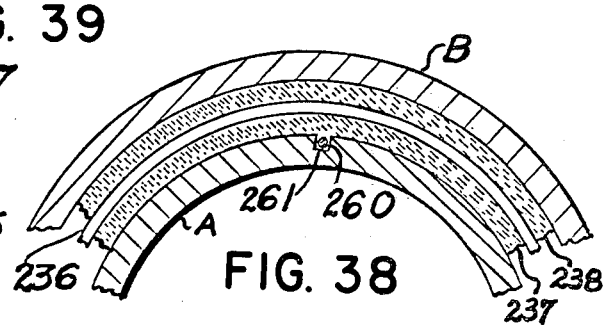
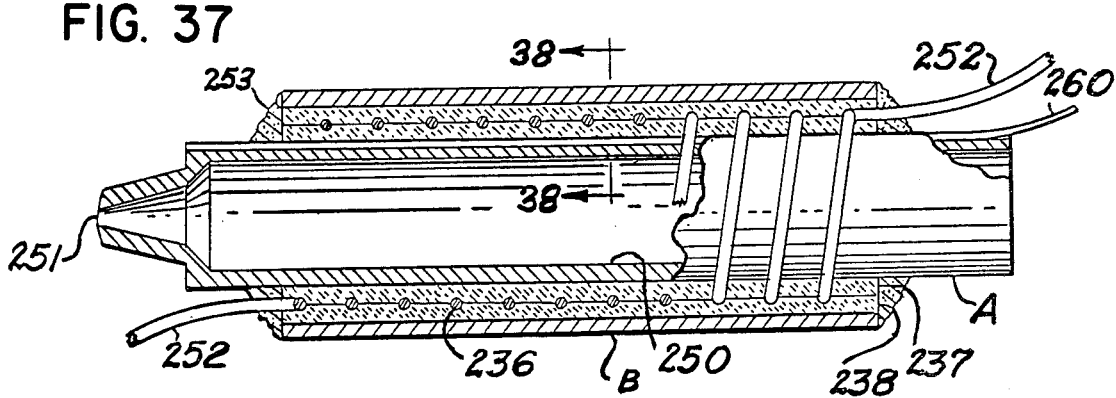

ELECTRICALLY HEATED NOZZLES AND NOZZLE SYSTEMS

This application is a continuation-in-part of my co-pending application Ser. No. 705,996, filed July 16, 1976, which was a continuation-in-part of my application Ser. No. 516,618, filed Oct. 21, 1974, now U.S. Pat. No. 3,970,821.

BACKGROUND AND SUMMARY OF THE INVENTION

This invention relates to improvements in electrically heated nozzles, including torpedos, spreaders and heater bodies, for plastic molding or die casting equipment, and to the method for making the same. The invention also relates to nozzle systems utilizing such electrically heated nozzles, and to a lead arrangement for such nozzles and a method for making such a lead arrangement.

Such nozzle devices may be inserted into the orifice of the sprue fitting of the equipment to maintain the temperature of the material flowing therethrough during injection into a mold or die. The nozzle is an integral unit and includes an internal heater body comprised of an insulated heater coil, which may have at its ends frangible ceramic spacer discs for holding the heater body axially spaced from the walls of its metal casing. The resistance wire is connected to leads that extend out of the nozzle for connection with a source of electric current, as the leads may exit through holes in the spacer discs or through an opening formed along the length of the nozzle.

The space inside the casing, not occupied by heater coil and leads, is filled and packed with insulation material, such as magnesium oxide powder or other similar heat transfer or ceramic material, like aluminum oxide or boron nitride, which occupies all voids within the casing, to maintain high heat transfer between the heater coil and casing. The casing may be shaped to fit into and form a part of the delivery channel for conveying molten material into a forming cavity.

One embodiment of the invention utilizes flexible green insulator strips, which may consist of mica flakes or ceramic particles impregnated in heat dissipatable material, and electrical resistance wire may be wound on these green insulator strips. The wire wound green insulator strips may be inserted into the casing, whereupon the casing is packed with insulation, filling all voids between the casing and wire. The assembly is heated to bake out the heat dissipatable material and bind the insulating particles together, and the assembly is then compressed and the casing may be formed as desired. By selectively using a combination of the green strips of heat dissipatable material in conjunction with insulation powder, fabricated as described, the nozzle may be made in a shorter time with varried heat insulation and transmission characteristics but good electrical insulation characteristics, as to direct heat to the molding orifice and away from other parts of the nozzle.

The nozzle assembly should be compressed to eliminate air voids, usually by swaging or rolling, which compacts the insulation material firmly between the heater body and casing to insure that all voids in the casing are filled. The heated nozzle assembly is formed as an integral unit, thus affording optimum heat transfer characteristics between the heating core and casing. The open end of the nozzle casing must be sealed, preferably with fiber or nylon discs, to prevent slippage or loss of heater components during assembly and swaging of the device.

Thermocouple means may also be provided within the casing and connected to the heater wire internally of the casing or at the casing exit, and the assembly may be integrally formed with the thermocouple.

Because of the integral nature of a heated nozzle made in accordance with this invention, which permits nozzle fabrication of minimum cross section with high heat transmission and control, such a heated nozzle is ideal for hot runner or runnerless molding, suitable for ring gating, valve gating, sprue gating, or edge gating systems.

OBJECTS OF THE INVENTION

It is therefore an object of the invention to provide a unitary heated nozzle of the character referred to. Another object is to provide a heated nozzle of the character referred to having a heater element therein which terminates closely adjacent its flow channel and has a shaped casing to insure uniform heating of the entire flow area of the nozzle.

Another object is to provide a compressed heater assembly integral with and in a nozzle device of a given minimum size capable of producing high operating temperatures.

Another object is to provide an integral heated nozzle device without air voids therein.

Another object is to provide a unitary heated nozzle with insulation characteristics which may be varied to direct maximum heat to its flow passage.

Another object is to provide a formed nozzle for a system which may be fabricated by a method including the steps of winding resistance wire around a strip of flexible material impregnated with insulation particles and heating the formed assembly to bake out material in said strip which may be dissipated by heat and bind insulating particles together.

Another object is to provide novel means for exiting leads and thermocouple wires from a nozzle assembly.

Another object is to provide a novel heated nozzle system having an integral heated nozzle therein.

Another object is to provide a heated nozzle and nozzle system which is not difficult or expensive to manufacture and which is very efficient in use and increases heater life substantially over the life of conventional cartridge heaters inserted in a molding orifice nozzle, and a nozzle unit which is easy to replace when no longer serviceable.

Other objects and advantages of the invention will become apparent with reference to the following description and the accompanying drawings.

BRIEF DESCRIPTION OF THE DRAWINGS

In the drawings:

FIG. 7 is a tail end view of a wound heating element core, leads and thermocouple assembly during a first stage of fabricating a nozzle in accordance with the invention.

FIG. 8 is a side elevational view of the assembly shown in FIG. 7.

FIG. 9 is a head end view of the assembly shown in FIG. 7.

FIG. 10 is a tail end view of a nozzle casing bored to receive the assembly shown in FIGS. 7-9.

FIG. 11 is a side elevational view showing the nozzle casing of FIG. 10, with the casing bore shown in dotted lines.

FIG. 12 is a head end view of the casing shown in FIG. 10.

FIG. 13 is a tail end view of a nozzle casing bored as shown in FIG. 10, except the bore is plugged upon insertion therein of the structure shown in FIGS. 7-9.

FIG. 14 is a side elevational view of the nozzle casing shown in FIG. 13, with the casing bore and structure of FIGS. 7-9 shown in dotted lines.

FIG. 15 is a head end view of the nozzle casing shown in FIG. 13.

FIG. 16 is a tail end view of a nozzle casing with a plugged bore as shown in FIG. 13 and material flow passages formed therein.

FIG. 17 is a side elevational view of the nozzle casing shown in FIG. 16, with the material flow passage shown in dotted lines.

FIG. 18 is a head end view of the nozzle casing shown in FIG. 16.

FIG. 19 is a tail end view of a shaped nozzle.

FIG. 20 is a side elevational view of the shaped nozzle shown in FIG. 19, with the material flow passage shown in dotted lines.

FIG. 21 is a head end view of the shaped nozzle shown in FIG. 19.

FIG. 22 is a sectional view of the shaped nozzle shown in FIG. 20, with a sprue bushing attached thereto, showing the direction of material flow, taken on line 22—22 of FIG. 20.

FIG. 23 is a sectional view of a nozzle system utilizing a shaped nozzle of the kind shown in FIG. 22, made according to the steps shown in FIGS. 7 through 21.

FIG. 30 is a sectional view of another modified nozzle system embodying the invention, showing an edge gating arrangement.

FIG. 31 is a detailed enlarged section view of the edge gating arrangement shown in FIG. 30.

FIG. 32 is a schematic view showing the edge gating arrangement of FIG. 30, the molding cavities being shown in dotted lines.

FIG. 33 is section view of another modified nozzle system embodying the invention, showing a valve gating arrangement.

FIG. 34 is an enlarged fragmentary central sectional view a heater element casing assembly for the nozzle before sealing the insert end thereof and compression of the casing.

FIG. 35 is a diametrical sectional view of the assembly taken on line 5—5 of FIG. 34.

FIG. 36 is an axial sectional view of a completed torpedo for a nozzle assembly.

FIG. 37 is an axial sectional view of a modified heater nozzle.

FIG. 38 is an enlarged fragmentary diametrical sectional view of the heated nozzle shown in FIG. 37.

FIG. 39 is an enlarged fragmentary sectional view of a modified heated nozzle.

DESCRIPTION OF PREFERRED EMBODIMENTS

Heated nozzles embodying the present invention may be untilized in any molding technique where it is desired that the melt-stream within the mold material delivery passages are continuously maintained at injection temperature, and the nozzle systems disclosed herein are exemplary for such techniques.

Figure 2:
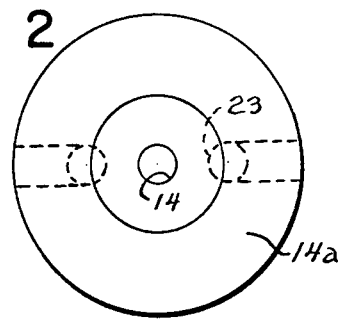
FIG. 2 is a top plan view of the nozzle assembly shown in FIG. 1.
Figure 5:
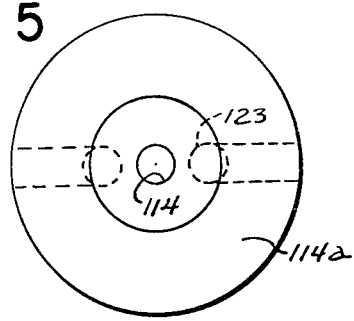
FIG. 5 is a top plan view of the nozzle assembly shown in FIG. 4.
Figure 1:
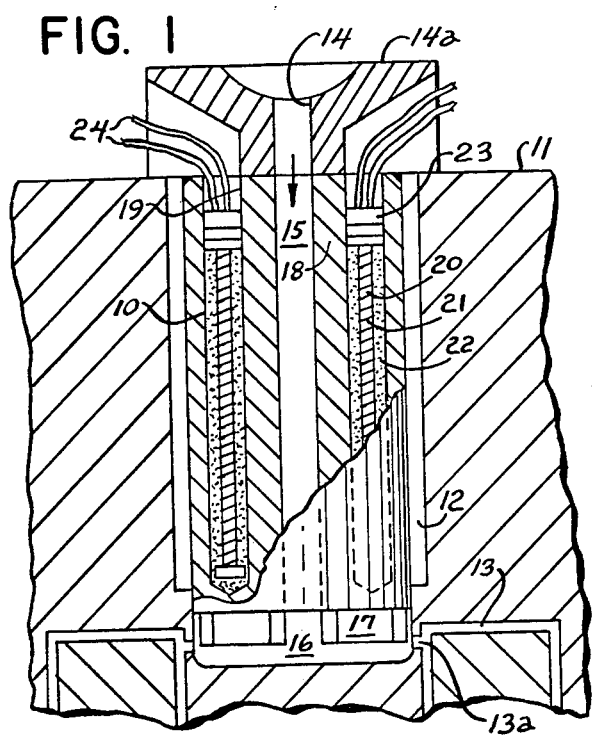
FIG. 1 is a section view of an edge gate finned style nozzle assembly in a nozzle system for hot runner molding.
Figure 4:
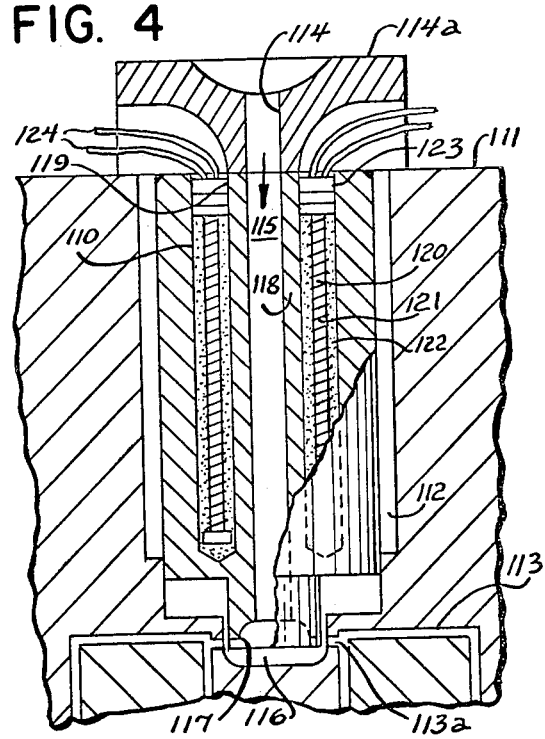
FIG. 4 is a section view similar to FIG. 1, showing an edge gate sprue nozzle assembly in a nozzle system for hot runner molding.
Figure 3:
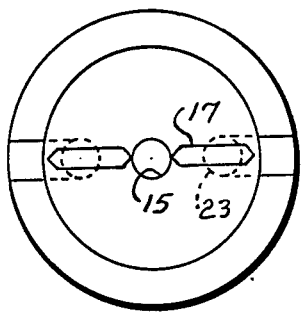
FIG. 3 is a bottom plan view of the nozzle assembly shown in FIG. 1.
Figure 6:
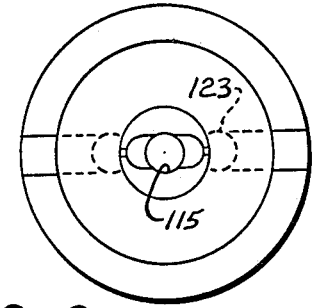
FIG. 6 is a bottom plan view of the nozzle assembly shown in FIG. 4.
Figure 25:
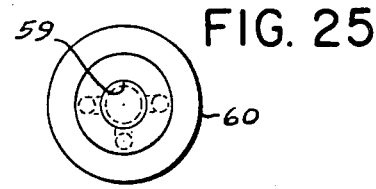
FIG. 25 is a tail end view of the nozzle shown in FIG. 24.

With reference to the accompanying drawings, and particularly to FIGS. 1-6, the heated nozzle system consists of a nozzle 10 or 110, which is installed in a body 11 or 111 having an opening or sprue 12 or 112 for receiving the nozzle, which communicates with a cavity 13 or 113, through a gate 13a or 113a. The melt stream is delivered through the nozzle 10 or 110 under heat and pressure from an opening 14 or 114 in a fitting 14a or 114a which communicates with a orifice 15 or 115 in the nozzle, to a chamber 16 or 116 in the body. When a finned style edge gate nozzle system is used, as shown in FIGS. 1-3, the tail end of the nozzle orifice 15 is flanked by fins 17 in the melt stream. Where a sprue type edge gate nozzle system is used, as shown in FIGS. 4-6, the tail end of the nozzle 110 may be formed with a domed opening 117 extending across the orifice 115 in the melt stream.

Internal of the nozzle 10 or 110 is a nozzle casing 18 or 118 in which is formed one or more bores 19 or 119 into which there is fitted a core 20 or 120 wound with resistance wire 21 or 121, packed with insulating material 22 or 122 and sealed in the bore by means of discs 23 or 123, with leads 24 or 124 extending therethrough, for connecting the wire 21 and 121 with a source of power. The nozzles 10 or 110 comprise and integral unit with the wire wound core packed with insulation, and the structure is compressed and swaged to insure that there are no voids in the nozzle. The wire wound core is unsheathed, and the entire assembly is fabricated to provide maximum heat transfer to the melt stream in the smallest possible cross-sectional area.

With reference to FIGS. 7-25, and particularly to FIGS. 7-21 showing the intermediate steps in making a nozzle as shown in FIGS. 22 and 24-26 for use in a nozzle system as shown in FIG. 23, a ceramic or other non-conductive core 40 is wound with electrical resistance wire 41, the wire passing through apertures at the flange 42 on the tail end of the core and exiting from the core at the flange 43 on the head end of the core, where the leads 45 pass into a thermocouple body 44, having embedded therein a thermocouple member 55.

A nozzle body 48 is formed with a bore 49a to receive the core-wire assembly and a bore 49b to receive the thermocouple assembly, and the body is grooved between the bores, at 50, to accommodate the leads 45. The core-wire assembly and thermocouple assembly is then inserted into the bores 49a and 49b, respectively, and the bores are filled with insulating material, preferably with the slot 50 plugged, whereupon the assembly is vibrated to compact the insulating material and the assembly is then compressed, preferably by swaging, which creates a unitary structure.

The nozzle 48 may then be drilled to provide passageways 51 for the melt stream therethrough, as shown in FIGS. 16-18 (the position of the core-wire assembly and the thermocouple assembly not being shown in those views). After the material passageways 51 are formed, the nozzle 48 may then be shaped as shown in FIGS. 19-21, for example to provide a nozzle head 52, a delivery channel head 53, opening therein a melt stream delivery orifice 54. By opening the side of the nozzle 48 intermediate its length, the lead 45 and thermocouple 55 may be exposed through the opening 56 in the nozzle wall.

As shown in FIGS. 22-26, the completed heated nozzle 48 may be finished in any suitable manner, as by sealing the slot 50 with a plug 57, and welding on a sprue bushing 58, having an orifice 59 communicating with the melt-passageways 51, which may have a mounting flange 60. As shown in FIG. 23, the finished nozzle 48 may be installed in a mold body 61, as by means of a ring 60a surrounding the nozzle sprue bushing flange 60, projecting into the mold body orifice 62, leading to a runner 63 through the gate 63a. The leads 45 may be finished by installing them in a lead channel 64 formed in the body 61, through an insulated sleeve 66, whereupon the lead opening 56 is sealed by potting cement 67 or other means for sealing the lead exit from the nozzle 48.

Figure 28:
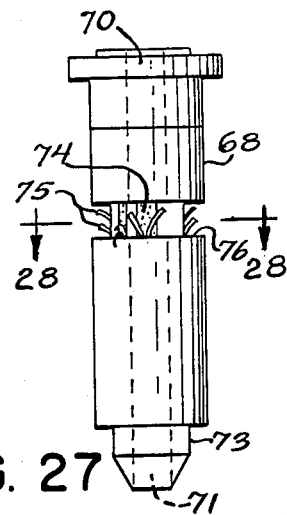
FIG. 28 is a sectional view of the nozzle shown in FIG. 27, taken on line 28—28, except showing leads connected to the wires.
Figure 24:
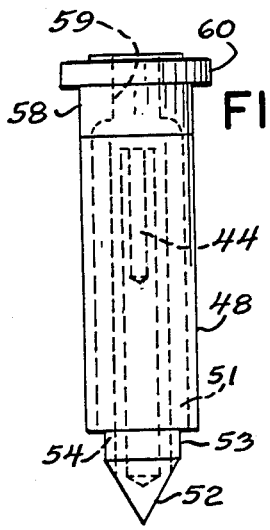
FIG. 24 is an elevational view of the nozzle shown in FIG. 22, with the flow passages, heater element and thermocouple shown in dotted lines.
Figure 27:
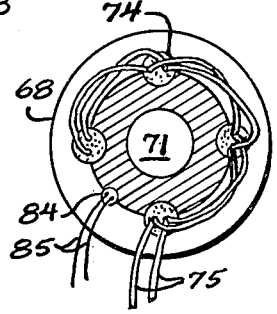
FIG. 27 is a elevational view of another nozzle embodying the invention, which has been grooved to expose the thermocouple and heat element wires.
Figure 26:
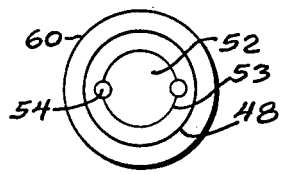
FIG. 26 is a head end view of the nozzle shown in FIG. 24.

With reference to the lead arrangement shown in FIGS. 27 and 28, the nozzle body 68 is formed wih a mounting flange 70 and has extending through the nozzle a melt stream delivery channel 71, the nozzle having been formed with a reduced diameter head 73 to accommodate a mold sprue (not shown). Multiple heaters 74 are provided in the nozzle 68 surrounding the flow passageway 71, the nozzle having been constructed according to the invention disclosed above. Leads 75 connected to the wire in the heaters 74 are connected by milling a groove 76 in the nozzle 68. A thermocouple 84 may be likewise disposed in the nozzle body 68, and its exit wires 85 are likewise exposed by the groove 76, whereupon the leads 75 may be wired together and connected with the thermocouple to a source of power.

Figure 29:
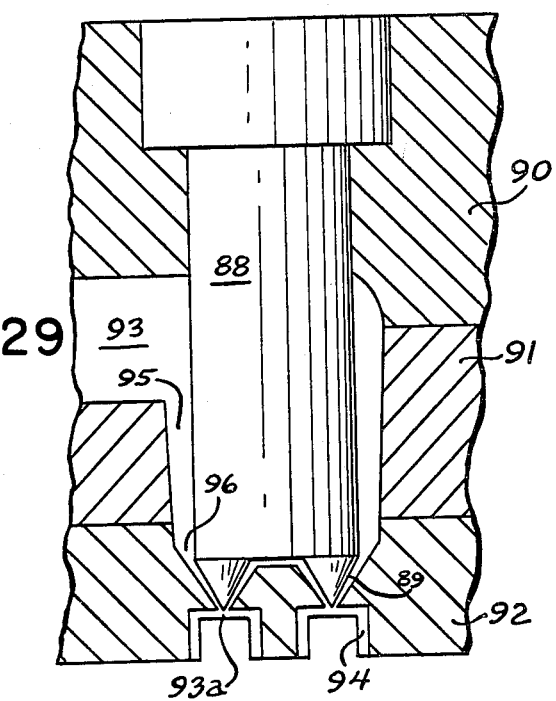
FIG. 29 is a sectional view of a nozzle system embodying the invention, showing a cluster ring gating arrangement.

In the embodiment of the cluster ring gate nozzle system shown in FIG. 29, a torpedo 88 having multiple gating tips 89 is secured in a body comprising a top runner plate 90, bottom runner plate 91 and top cavity plate 92, having therein passages for containing the melt stream for delivery of molten material through a gate 93a to a cavity 94. These melt stream passages comprise a runner 93 feeding into a sprue 95 of lesser cross-section and a more restricted subsprue 96 leading to the gate 93a. This torpedo 88 is fabricated in the manner previously described as a single unitary heated body, with the heater core contained in insulation and compressed within the torpedo, for transmitting heat to the entire sprue, subsprue and gate.

FIGS. 30-32 show an edge gate nozzle system utilizing a slotted torpedo 148. This slotted torpedo has a centering stub 149 and fits into a body comprising a top runner plate 150, bottom runner plate 151 and top cavity plate 152, having therein melt stream passages, which comprise a runner 153 communicating with the cavity 154 through a gate 153a. This melt passage has a sprue 155, sprue restriction 156, which together with the gate 153a is defined by a gate land 158. Similar to the edge gate finned system shown in FIGS. 1-3, the spue end of the torpedo 148 has a series of slot 157 thereabout, which perform a similar function to the fins previously described. This torpedo 148 is fabricated in a manner previously described, also as a single unitary heated body, with the heater core contained in insulation and compressed within the torpedo, for transmitting heat to the entire sprue, sprue restriction and gate, and permits multiple cavities to be filled with a single torpedo, as shown in FIG. 32.

A gating torpedo shut off nozzle system is shown in FIG. 33, which comprises a torpedo 168 having a centering gate valve pin 169 reciprocable therethrough, the pin having a tip 169a for opening and closing the gate in a manner to be described. This torpedo 168 is secured in a mold body 170 with the valve stem end 171 reciprocable therein and connected to means for moving it. Passageways for the melt stream are formed in the body 171, comprising a runner 172, sprue 173 and subsprue 192, leading to the gate 173a, which may be opened and closed to fill the cavity 174 by manipulation of the valve tip 169a against and away from the gate 173a. The integral heating element of this torpedo 168 is formed in the manner described and generally consists of a torpedo body 180 formed with a bore 183 into which is installed an unsheathed heater wire winding 181 covered by compacted insulator particles 182. Leads 185 connect the ends of the wire winding 181 and extend out of the mold body 170 where they are connected to a source of power.

A typical electrically heated torpedo 210 for a nozzle system and intermediate steps in the making of same is shown in FIGS. 34-36, wherein a centrally bored cylindrical metal casing 218, having an open end 221 receives therein an unsheathed electrical heating element 222. The heating element 222 comprises resistance wire 223 which is wound tightly on an insulator core 224, the core having lead wires or pins 225 extending from the wire winding and out of the casing. A ceramic spacer disc 226 closes the open bore, which has been filled with heat transmitting electrical insulating material 227, such as magnesium oxide powder. A mica or lava washer 228 and a nylon washer 229, through which the leads 225 extend, may seal the casing bore. The assembly is vibrated to pack the insulating powder tightly within the casing, as to fill all air voids within the assembly. The entire assembly is then swaged, as to reduce the diameter of the casing 218 and compress the packed insulation material 227 into minute voids within the bore 219, thereby providing effective heat transfer contact between the heating element 222 and the casing 218, to insure transfer of heat to the casing.

The closed casing end 231 may be shaped by milling for use in a nozzle system as previously shown. Temperatures may be controlled by a thermocouple 232 embedded in the insulator material 227. The exposed leads 225 may be sealed in ceramic sleeves 233, which may be contained in a radial trough 334 formed in a flange welded to the torpedo body, where the wires may be connected to a source of electric current.

A modified form of nozzle construction is shown in FIGS. 37 and 38, wherein electric resistance wire 236 is wound over a strip of insulator material 237, which has been wound around a metal pipe core A. A second layer 238 of strip insulation material is formed around the wire winding 236. A second metal pipe B is telescoped over the wire wound strip assembly, 236, 237, 238, respectively, whereupon the entire assembly is compressed together, as by swaging or rolling, to bring the materials into intimate contact with one another; and after the compression step, the assembly is heated to bake out binder materials in the strips and to bind the mass into a unitary form having embedded therein the heater wire 236. A second compression operation, as by swaging, may be performed after the baking step to increase the insulator density, thereby filling all voids between the inner and outer pipes A and B, respectively, to enhance the heat transfer characteristics of the assembly.

The strips 237 and 238 before baking each comprise a body of green insulator particles, which may comprise ceramic particles rolled or impregnated to a high density in heat dissipatable binder material, or the body may comprise pressed mica flakes. In the green state the strips are relatively pliable and bendable, permitting them to be formed around the metal core A, but when baked the strips 237 and 238 become hard and the particles agglomerate into a mass.

After the compressed material is formed into a unitary mass, the assembly may be machined to a selected configuration or other parts may be joined thereto. Preferably, the nozzle is is formed with a central melt stream channel 250, by using heavy wall pipe stock or by drilling the channel in rod stock, and the end is shaped to provide a discharge orifice 251. Leads 252 may be connected to the ends of the resistance wire 236, and heat resistant cement 253 or other suitable material may seal the lead connections and peripheral space between the core A and casing tube B. A thermocouple 260 may be installed in the nozzle to control temperature by forming a groove 261 along the length of the core A, as shown in FIG. 38.

FIG. 39 shows another embodiment of the nozzle similar to the embodiment shown in FIGS. 37 and 38, except that only the inner flexible strip 237 is utilized with the wire 236 wound thereon, and in place of the outer strip insulation powder 255 is packed in the manner described between the outer tube B and the wire wound strip assembly, in which event the end recess 257 between the core and telescoped tube, A and B, respectively, is sealed with a lava disc 256 and a plastic disc 258. The assembly is then compressed, baked and swaged in the manner described with respect to the embodiment shown in FIGS. 37 and 38. The use of different insulation materials as shown in FIG. 39 permits the substrate layer 237 to be fabricated from material of good electric insulating properties but high heat conductive characteristics, and the powder layer 255 may have high electric insulating properties and high heat insulating properties, so that the heat is directed to the flow channel 250 within core A and the outer wall of tube B is of lesser temperature.

As compared to ceramic band heated nozzles and cartridge heated nozzles, it has been found that swaged integral heated nozzles embodying the invention operate far cooler, providing improved efficiency, strength and safety. Nozzle heat losses using heated nozzles embodying the invention are reduced by 25% to 50% over prior art ceramic band and cartridge heated nozzles, depending upon bore operating temperatures, the higher the temperature the greater the heat loss with conventional nozzles. Metal tensile strength, which is greater at lesser operating temperatures, is improved and longevity is increased for nozzles embodying the present invention as compared to conventionally heated nozzles. Electrical lead and connection failures caused by excessive exposure to high heat is reduced with the present construction as compared to ceramic band and cartridge heated nozzles. Additionally, the invention provides a lesser number of leads with improved exiting, with improved durability and simplified sealing, as compared to the prior art. As important, the embodiments of the invention disclosed permit smaller physical nozzle size as compared to the greater space requirements for ceramic band and cartridge heated nozzles. Heater life is markedly improved and higher wattage values may be attained with the present invention.

Although I have described preferred embodiments of the invention in considerable detail, it will be understood that the description thereof is intended to be illustrative rather than restrictive, as details of the structure and the steps of the methods may be modified or changed without departing from the spirit or scope of the invention. Accordingly, I do not desire to be restricted to the exact constructions and steps of the methods described and shown.

I claim:

1. A heated nozzle system for maintaining a melt stream passing over a surface at an elevated temperature, said nozzle system comprising, in combination: a body having a sprue therein; a heated nozzle member in said sprue, said nozzle member consisting of a one piece integral assembly comprising a casing, a bore in said casing, an unsheathed electric heater within said bore, and heat transmitting electrical insulation material surrounding said heater compacted within said bore without air voids between said heater and said bore; a melt passage within said body arranged in direct heat transfer relation to said nozzle member; electrical insulation means closing said bore; and electric leads connecting said heater to a source of current.

2. The heated nozzle system recited in claim 1, wherein said nozzle is shaped at one end to restrict said melt passage, said body having a gate in flow communication with said melt passage and said shaped nozzle end having slot defining the location of said gate.

3. The heated nozzle system recited in claim 1, wherein said melt stream passage extends through said nozzle.

4. The heated nozzle system recited in claim 3, wherein said body has a gate in flow communication with said melt stream passage, and a finned member integral with and extending from said nozzle into said gate for heating the melt stream passing therethrough.

5. The heated nozzle system recited in claim 3, wherein multiple like melt stream passages extend through said nozzle and flank said bore.

6. The heated nozzle system recited in claim 3, wherein said nozzle has multiple like bores, each filled with an unsheathed electric heater, insulation material and insulated sealing means.

7. The heated nozzle system recited in claim 6, wherein said bores flank said melt stream passage.

8. The heated nozzle system recited in claim 7, wherein the periphery of said nozzle is grooved midway its length to expose and for exit of said thermocouple and said leads.

9. The heated nozzle system recited in claim 8, wherein said thermocouple and leads are connected external to said nozzle and said groove is sealed and insulated around said thermocouple and leads.

10. The heated nozzle system recited in claim 1, wherein a reciprocating valve extends longitudinally through said nozzle to open and close said melt passage.

11. The heated nozzle system recited in claim 1, wherein said casing comprises a metal tube telescoped over a metal core and said bore is defined by the space between said core and bore.

12. The heated nozzle system recited in claim 1, wherein said insulating material comprises an agglomerated sandwich of insulating material surrounding and embedding said heater therein compressed within said nozzle.

13. The heated nozzle system recited in claim 12, wherein said sandwich comprises a layer of insulating material and said heater comprises wire wound around said layer, and another layer of insulation material overlies said wire wound layer.

14. The heated nozzle system recited in claim 1, wherein said nozzle has a second bore and a thermocouple is sealed therein electrically connected to said heater by said leads.

* * * * *